(12) United States Patent
Eng et al.

(10) Patent No.: US 8,249,574 B2
(45) Date of Patent: Aug. 21, 2012

(54) COMMUNICATION METHOD AND SYSTEM

(75) Inventors: Kai Y. Eng, Atlantic Highlands, NJ (US); Pramod Pancha, Belle Mead, NJ (US)

(73) Assignee: Bellmar Communications LLC, Chicago, IL (US)

( * ) Notice: Subject to any disclaimer, the term of this patent is extended or adjusted under 35 U.S.C. 154(b) by 218 days.

(21) Appl. No.: 12/691,978

(22) Filed: Jan. 22, 2010

(65) Prior Publication Data

US 2011/0183652 A1    Jul. 28, 2011

(51) Int. Cl.
*H04M 3/00*      (2006.01)
*H04M 3/42*      (2006.01)
*H04W 40/00*     (2009.01)

(52) U.S. Cl. .............. 455/418; 455/414.1; 455/466; 455/416

(58) Field of Classification Search .......... 455/418
See application file for complete search history.

(56) References Cited

U.S. PATENT DOCUMENTS

2002/0188684 A1* 12/2002 Liang .................... 709/206
2005/0129206 A1*  6/2005 Martin .................. 379/211.01
2010/0081419 A1*  4/2010 Chiang et al. ............ 455/416

* cited by examiner

*Primary Examiner* — Lester Kincaid
*Assistant Examiner* — Andy Gu
(74) *Attorney, Agent, or Firm* — Kaplan Breyer Schwarz & Ottesen LLP

(57) ABSTRACT

A software button and software agent downloaded to a computing in response to actuation of the button make it possible to create a communication connection providing privacy, security and dynamic control of service. In one embodiment an online telephone directory comprised of software buttons is provided, in which a calling party can select a called party by clicking a software button dedicated to the called party. The button provides an identification of the called party, but all contact information is hidden and inaccessible to the calling party. Upon actuation of the button server containing the directory causes download of a software agent to the calling party's computing device, causing it to establish communication with the called party. In a second embodiment, software buttons provide a communication service which is dynamic, the nature or type of service changing based on conditions predefined by the called. For example, a called party may specify that, during business hours, communication be by telephone to a specific telephone number and outside of business hours, communication be by text message if urgent and e-mail if not urgent. When the calling party clicks a software button, the software agent downloaded to his computing device would then be a soft phone during business hours. Outside of business hours, a software agent would be downloaded to the calling party which would inquire whether the call is urgent and, depending upon the response, would provide a text message agent or an e-mail agent, respectively.

8 Claims, 4 Drawing Sheets

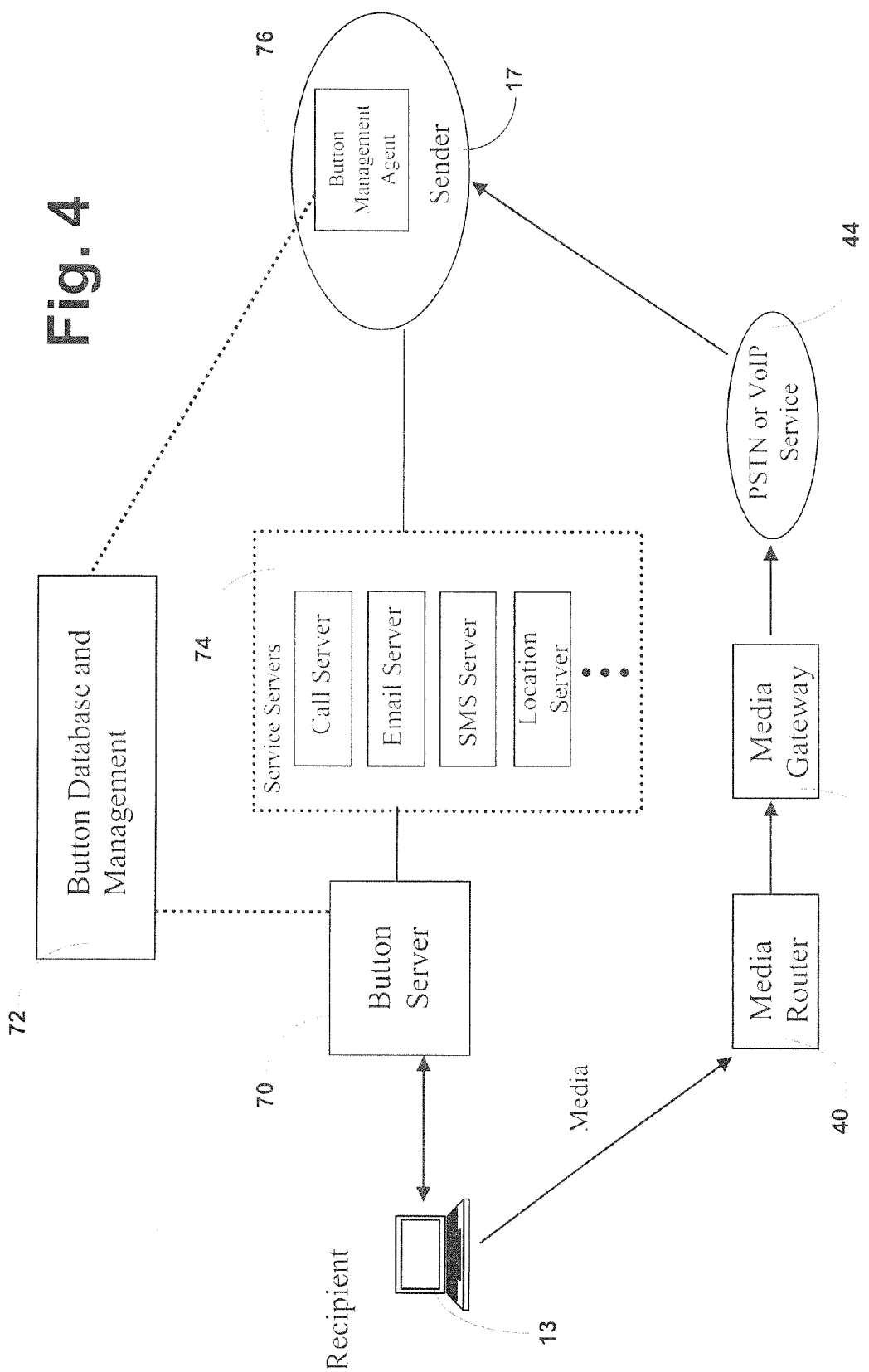

COMMUNICATION METHOD AND SYSTEM

FIELD OF THE INVENTION

The present invention relates generally to electronic communication and, more particularly, concerns communications which can be initiated through an externally provided, actuable executable, such as a software button, to control privacy, security and the nature and type of communication service.

BACKGROUND OF THE INVENTION

Communications associated with the present invention are provided through the use of a "computing device", which will be understood to include not only an actual computer, such as a personal computer, but also any kind of intelligent device, such as a personal digital assistant (PDA) or a smart telephone, capable of Internet browsing. For voice communications, the device will need to be capable of sensing sound, as through a microphone, and producing sound, as through a speaker or earphone. Communication takes place through a network, such as the Internet and, possibly, through the public service telephone network (PSTN).

In our co-pending U.S. patent application Ser. No. 12/603,683, filed Oct. 22, 2009, we disclose a method and system for facilitating telephone calls that convey the context of the call to the called party. The disclosure of that patent application is incorporated herein by reference in its entirety. In accordance with one embodiment of the invention disclosed in that patent application, a software button is utilized on a computing device to initiate a call. Activation of the button causes a "soft phone" to be downloaded from a server. The soft phone is essentially an executable software agent that operates on the computing device to set up a call to only a specified telephone number. The software agent causes certain call context information to be embedded which is unique to the actuated software button.

We have now found that the use of a software button and downloaded software agent offer additional benefits is in providing privacy, security and dynamic control of service.

For example, in accordance with one aspect of the present invention, an online directory, similar to a telephone directory but comprised of software buttons, is provided, in which a calling party can select a called party by clicking a software button dedicated to the called party. The button provides an identification of the called party, but some or all contact information may be hidden and inaccessible to the calling party. A server containing the directory will then cause download of a software agent to the calling party's computing device, which causes the calling party's computing device to establish communication with the called party. However, the called party can maintain privacy, or even complete anonymity.

In accordance with a second aspect of the invention, software buttons are utilized to provide a communication service which is dynamic. That is, the nature or type of service changes based on conditions predefined by the called party and information provided by the calling party. For example, a called party may specify that, during business hours, communication be by telephone to a specific telephone number and outside of business hours, communication be by text message if urgent and e-mail if not urgent. When the calling party clicks a software button, the software agent downloaded to his computing device would then be a soft phone during business hours. Outside of business hours, a software agent would be downloaded to the calling party which would inquire whether the call is urgent and, depending upon the response, would provide a text message agent or an e-mail agent, respectively.

BRIEF DESCRIPTION OF THE DRAWINGS

The foregoing description and other objects, features, and advantages of the present invention will be understood more completely from the following detailed description of presciently preferred, but nonetheless illustrative, embodiments in accordance with the present invention, with reference being had to the accompanying drawings in which:

FIG. 4 is a functional block diagram of an intelligent button service system embodying the present invention.

DETAILED DESCRIPTION OF THE PREFERRED EMBODIMENTS

Local telephone companies traditionally publish a Telephone Directory, essentially a directory of publicly listed telephone numbers of individuals and businesses (subscribers). Many forms and variations of such directories are available on the Internet, and search services like Google can provide easy and convenient lookup. The primary advantage of being listed in the Telephone Directory is its accessibility to the public. Unfortunately, that is also its primary disadvantage, owing to its widespread use for telemarketing, and such.

In recent years, cellular telephone (cell phone) numbers have become increasingly important for direct personal contact, but they are usually not published and are similar to unlisted numbers. Email addresses are also becoming important. Today, one's cell phone number and email address are, increasingly, becoming the most relevant contact information. At the same time, there has justifiably been a growing interest in protecting such information. It is therefore not surprising that no directory service is widely available to obtain such information. Instead, social networking websites have emerged as a means for people to stay in communication in a more secure way, to find new friends, or to reconnect with old friends. These websites typically require users to be registered members and can easily provide the privacy desired by most people, because members communicate through a private website using pseudo-identities, or user names, with personal contact information being hidden from others. Such websites are generally not searchable in the manner of public directories.

Making use of the present invention, it becomes possible to provide an electronic directory system offering services easily accessible by the public to reach any individual or business in a manner similar to a Telephone Directory, while at the same time easily protecting the subscribers' privacy. For convenience, such a system will be referred to as a Button Directory System, and the service a Button Directory Service.

Figure 1:
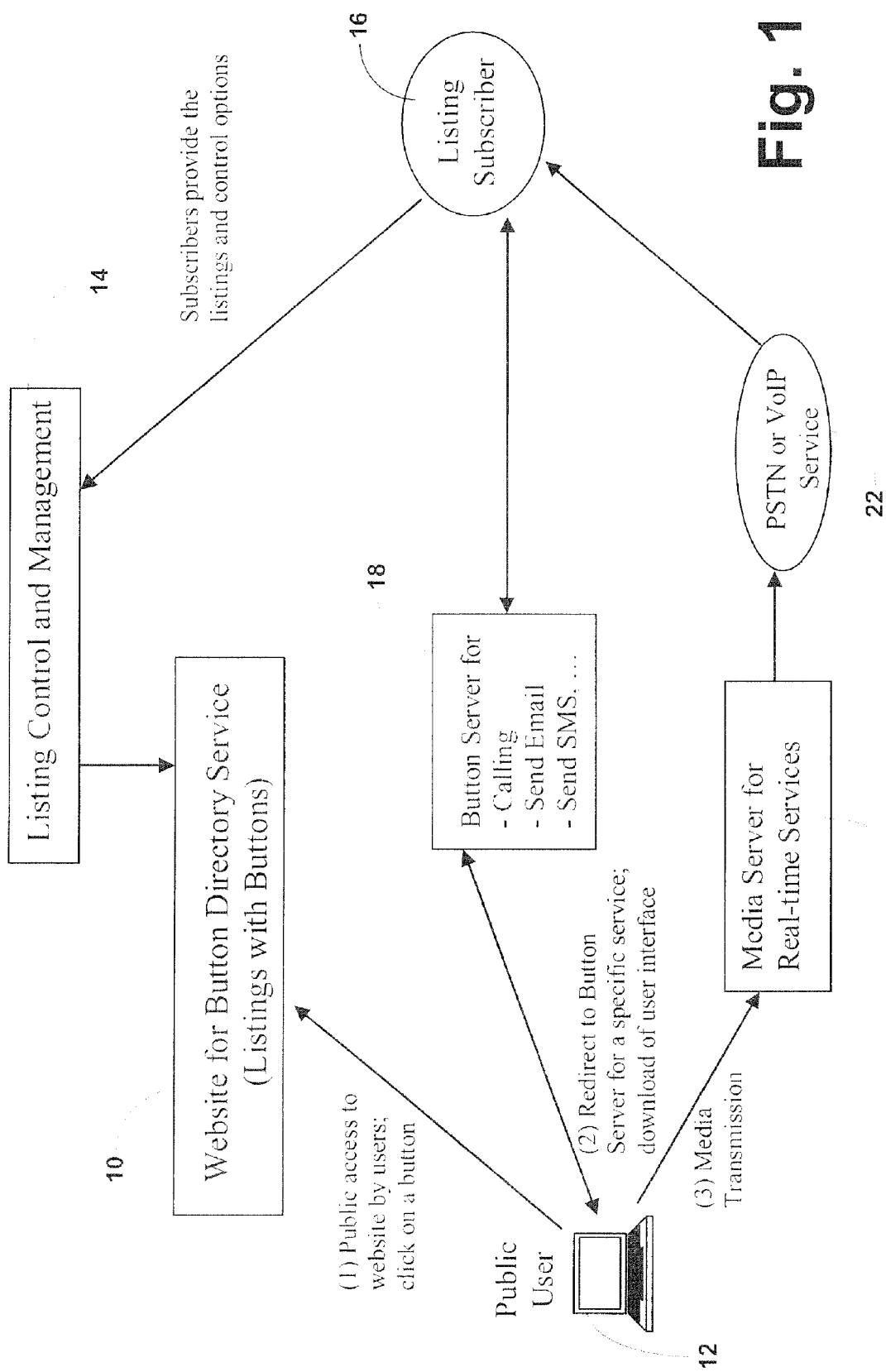
FIG. 1, is a functional block diagram illustrating the overall service operations for users and subscribers of a Button Directory System embodying the present invention.

FIG. 1, is a functional block diagram illustrating the overall service operations for users and subscribers of a Button Directory System embodying the present invention. The service is provided through a website 10 accessible to the general public (e.g. user 12). Information on this website is arranged in a manner similar to other directories for individuals and businesses, viewable by categories or by regions, and searchable by key words, and so on.

Listings are assumed to be supplied and controlled (block 14) by subscribers 16. Unlike a more conventional Telephone Directory is that a contact address for each listing is presented as a user-actuable software button, or some other actuable item, not as an explicit phone number or email address. Actuation of a button by a user 12 causes a software agent to be downloaded to the user's computer, which results in a communication connection with the selected listing subscriber.

For each listing button, actionable features could include: Calling, email, send SMS (Short Message Service) text message to cell phone or leave a message. However, the actual contact addresses are not available to the user seeking the connection (caller). These features are configurable (block 14) at the discretion of the subscriber.

In configuring a particular communication option, a subscriber obviously has to provide appropriate parameters to use. For example, the subscriber has to specify a phone number for calling, an email address for email, and so on. These parameters are written into a button database 32, available to server 10, and they are hidden from the users. The parameters provided by a subscriber can be changed anytime, and the change does not affect the listing of the buttons. While it is difficult to account for all kinds of privacy issues, it would be advantageous for the service to provide security guards against telemarketing calls and spam email. Many such techniques are well known in the art.

As a practical matter, rather than downloading a software agent, website 10, might simply transfer user 14 to a button server 18, which would present a menu to the user to select the type of communication desired with the selected subscriber. Upon receiving the user's response, the button server then downloads software to the user, providing the interface for the type of connection he selected. Alternately, website 10 could include a separate button for each type of service available for a subscriber (e.g. telephone, e-mal, SMS), and when the user actuates a button corresponding to a particular service, website 10 transfers him to server 18 and provides server 18 with sufficient information regarding the requested service. Server 18 then downloads executable software for the requested service. For example, it might download an e-mail interface linked to the selected subscriber to be run on the user's computing device.

The communication interface provided by button server 18 interacts with a media server 20, which provides real time communication services for the user's computing device. This can include PSTN or VoIP service if the user is communicating by voice.

Figure 2:
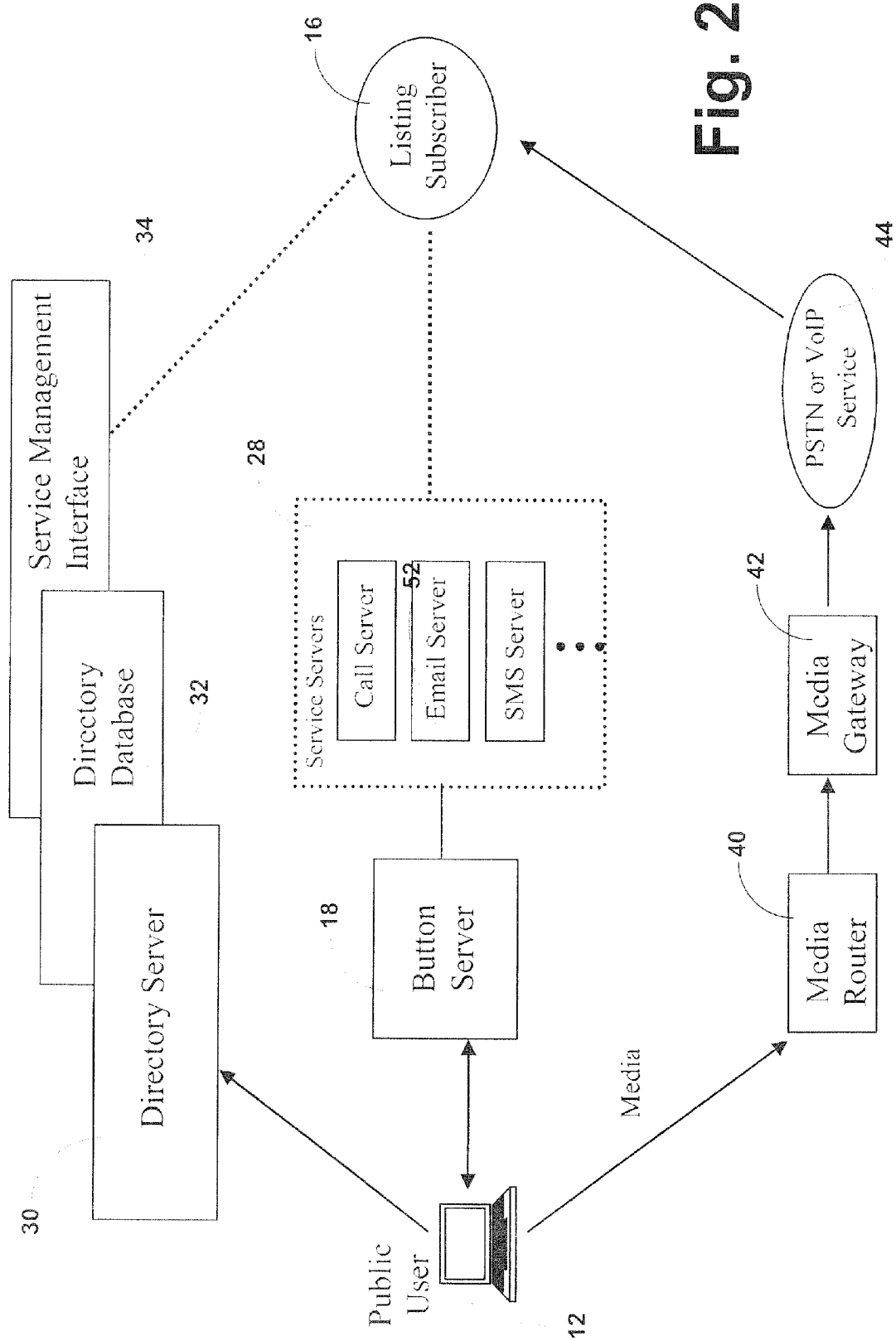
FIG. 2 is a functional block diagram illustrating a button directory system embodying the present invention.

FIG. 2 is a functional block diagram illustrating a button directory system embodying the present invention. A public user 12 communicates with the system through a directory server 30, which includes the website 10 as a user interface. The underlying information supporting the button directory system is maintained in a directory database 32, to which directory server 30 has access. The information in the database 32 is managed through a service management interface 34, to which each listing subscriber 16 has access, in order to manage the information in database 32 related to him.

After a user actuates a website listing button corresponding to a particular listing, directory server 30 transfers the user's computing device to button server 18, which downloads an executable agent to the user's computing device. That agent creates a communications interface to the user's computing device which communicates only with the selected subscriber, using the service the user selected for the communication. A listing subscriber has an interface 28, through which he may manage the communication services available to him. This includes, not only selecting services and to be available, but providing appropriate address and configuration information for each service. If a user's communication is to include media, the communications interface created on his computing device is directed to a media router 40 and, therethrough, to an appropriate media gateway 42. If the communication is a voice communication, the media gateway can direct the communication to the PSTN or a VoIP server 44, as appropriate.

For example, in the event that a service involving media transmission (voice or video) is invoked by the user, then the Button Server may download a web (voice or video) phone to a browser on the user's computing device, allowing the subsequent media connection to be made to the Media Router. The call can then be routed as shown in FIG. 2 through the PSTN or Internet. For some media services, such as recording a voice message, additional media-type servers such as a voicemail server may have to be used. Alternatively, or in addition, media players and or other web phone or media interface software already on the user's computing device may be invoked.

The disclosed system architecture can support any available anti-spam technique. For example, to make email spamming difficult, a so-called Captcha can be implemented in the email service to ensure that the email message is generated by a human rather than a machine. A common type of Captcha requires the user to type in alphanumeric digits from a distorted image appearing on the screen. To deter telemarketing calls, the calling feature can require the user to provide a phone number for call back, with the call being completed by bridging a call from the system to this call-back number and another call to the listing's number.

With the type of directory service described above, the listings are essentially virtual addresses for a subscriber, whose name (or pseudonym) is disclosed in public, but his real address information (and possibly his real identity) is hidden. More importantly, control of how a listed subscriber is reached is retained by the subscriber himself. This will permit online transactions to move in new directions. For example, it is relatively "safe" for individuals to put "want ads" in their public listings in order to solicit potential offerings from others. With the use of a proper matching-based application, this approach can facilitate buying and selling in a broad sense. Similarly, by giving permission for the website to use their preferences or parts of their profile, listing members of the service could allow certain advertising messages to be sent to their designated (internal) mail box. If organized properly, this approach helps merchants to direct their marketing materials to interested parties only and thus reduces the wastefulness of junk mail overall.

As an electronic system, the disclosed service can post any information for individuals and businesses in its listings without much constraint. As for individuals, an old-fashion telephone directory listing typically only provides name, address and home phone number. A service in accordance with the present invention, on the other hand, can include links to a personal website, a personal profile or any personal posting desired by the individual. A distinctive aspect in such listings is that the listing owner controls the privacy and access policy regarding such information. As is evident from the recent proliferation of social networking websites, many people want to be "known" or want to have a public presence, but they also wish to maintain a high level of personal privacy. As for businesses, the goal is obviously to make the contact information readily known and available to the public. As such, there is an added flexibility to have many buttons for different reasons or contexts to help direct the call to the right organization.

Dynamic Communication

Making a communication connection with another party typically means making a phone call (PSTN, cell or VoIP), sending an SMS (Short Message Service) message on a cell phone, sending an Instant Message (IM) on a computer or sending an email. In each of these examples, a "Caller", who initiates the call or the connection (real-time or messaging) with his telephone or computing device, makes a clear choice of the connection or service type to be used (i.e., phone, email, IM or SMS). Depending on the service type selected, the resulting connection is made to the appropriate receiving device (phone, computer, email box, etc.) used by the "Receiver", who is the intended recipient of the call.

These types of connections will be referred to as "static", because the underlying Caller or Receiver behavior and the underlying technical operations involving transmission, routing and reception of data are essentially predetermined when the Caller makes the call. For example, a Caller's initiation of a phone call results in a phone call connection, which does not unexpectedly change to an email session. Here we are referring to the call itself and not the known technique of changing the service delivery of data to the Receiver after the call or connection is completed, such as by using an answering machine, turning a recorded message into an email, or forwarding a message to SMS. These post-connection delivery actions do not change the static nature of the call itself. Similarly, dynamic routing of data to different physical destinations, such as call forwarding or call transfer does not alter the static nature of the call or connection.

A call or connection will be deemed "dynamic" or "intelligent" if the connection resulting from a call initiation can vary in dependence upon instantaneous states derived from inputs and/or parameters related to the Caller and/or Receiver. For example, a software button labeled "Connect to Joe Doe" is sent to a Recipient allowing the Recipient to make a call to Joe Doe, the "Sender" (of the button). When this Button is actuated (e.g. clicked) at different times, the resulting connection may be completely different. For example, the connection may be a phone call at one time and an SMS session at another time, generally not determined by the Caller's (the button "Recipient's") action alone.

In accordance with an aspect of the present invention, an intelligent service is provided, based on the use of dynamic software buttons. The service is "intelligent" or "dynamic" because the call or connection to be made can be different, depending on the information about the operating conditions or "states" predefined by the Receiver, Caller input, and the context of the call.

The software buttons in use are considered dynamic, because they are not dedicated to a particular service type, such as calling or e-mailing. The service created upon clicking on a dynamic button may vary depending on operating parameters and the inputs and parameters provided by the Caller and the Sender. These inputs and parameters together are called the state of the button. Thus, clicking on a button at different times may lead to different outcomes, according to the instantaneous state of the button. It should also be noted that each dynamic button uniquely defines a Sender (call Receiver) and a Recipient (call initiating Caller).

The terminology used above will be used consistently herein. That is, a button is sent from a Sender to a Recipient. When clicking on a button, the Recipient is attempting to initiate a call to the Sender. Thus, when the call is established, the (button) Recipient is the Caller (making the call), and the (button) Sender is the Receiver (of the call). Recipient and Sender are associated with the button operation, and Caller and Receiver are associated with the call session.

Figure 3:
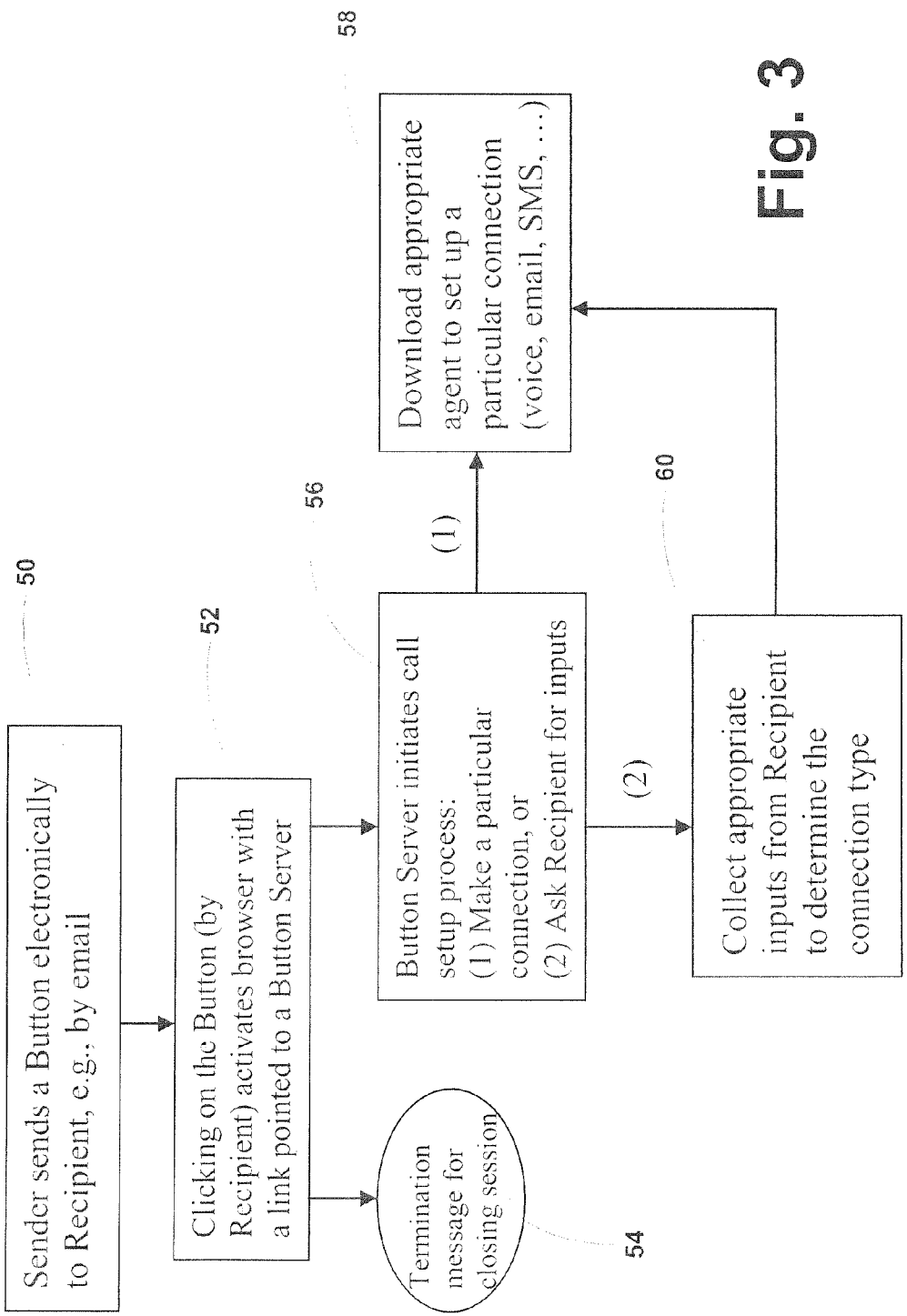
FIG. 3 is a flowchart illustrate the service usage steps between a Sender and a Recipient in accordance with an embodiment of the present invention.

FIG. 3 is a flowchart illustrating the service usage steps between a Sender and a Recipient in accordance with an embodiment of the present invention. The process begins at block 50 when the Sender sends a software button to a Recipient's computing device (for example, by email). When the Recipient actuates the received button by clicking on it (block 52), he can initiate a call or connection to the Sender. No preinstalled software is required on the Recipient's computing device other than a standard Internet browser.

After the Recipient initially clicks the button, he may receive a termination message closing the session (block 54) if the connection cannot be established. Otherwise, there are two possible outcomes of the Recipient's action, at block 56: (1) A particular service connection is initiated to reach the Sender, or (2) a message window is opened on the Recipient's computing device prompting the Recipient for inputs. In the event of outcome (1), control is transferred to block 58, where an appropriate executable agent is downloaded to the Recipient's browser to support the particular service being initiated. In the event of outcome (2), a user interface is downloaded to the Recipient's computing device for the Recipient to provide the input information to determine the connection type (block 60). Following receipt of the Recipient's input, control is transferred to block 58, where an appropriate executable agent is downloaded to the Recipient's browser to support the particular service being initiated. The process ends at block 58.

It should be noted that at block 60, the Recipient is not determining the type of connection to be made but is providing information that will be used to determine the type of connection, based on pre-established considerations. For example, the Recipient might be asked whether the call is urgent or to describe the subject matter. Based on the Sender's prior action, for urgent, matters or certain subject matter a telephone connection might be established, while for non-urgent matters or other subject matter a busy signal may be posted and an e-mail connection might be established. Similarly, during certain hours a busy signal might be posted and an SMS connection might be established instead of a telephone connection.

The idea is that some Recipient inputs may be used by the system to decide what to do with the call. The logic for call handling is determined by the states preset by the Sender.

FIG. 4 is a functional block diagram of an intelligent button service system embodying the present invention. A button received by a Recipient's computing device 13 is essentially a website link to a Button Server 70. In addition to the Button Server address, the button is also encoded with a unique button identification (BID). When the button is clicked, the Recipient's web browser opens a link directed to the Button Server as equivalent to a call request. When the BID is received by Button Server 70, a lookup is done immediately in a button database accessible to Button Server 70 (in Button Database and Management Unit 72) using the BID, to retrieve the instantaneous state of the Button.

The state of the Button here refers to parameters preset by the Sender for various options for responding to a call request. These parameters may be changed by the Sender at will by accessing Database and Management Unit 72. For instance, a Sender may set an option to post a particular message and to respond with an SMS connection. In that case, an agent will be downloaded from the Button Server to the Recipient's computing device to display the Sender's message and also a user interface for the Recipient to input a message to be sent as SMS to the Sender. At another time, a click on the same Button may result in a direct phone call to the Sender, assuming the Sender has chosen to set the Button state to respond with a voice connection. As mentioned earlier, some options may also request additional inputs from the Recipient before a particular connection is chosen, such as to whether the call is urgent or not.

The service servers 74 shown in FIG. 4 are used to provide various services or connections. The Sender's computing device 17 has access to servers 74, in order to set up various services. For example, the Sender needs to provide telephone numbers and e-mail addresses to service servers 74. For real-time services, e.g., voice or video, media packets are transmitted from the Recipient's computing device 13 to a Media Router 40 and media gateway 42 for handling instead of going through the Button Server. It should be noted that there are also non-connection oriented services possible in this system, e.g. Sender Location or Presence. These latter services, however, are not related to the concept of dynamic buttons.

In another enhancement, an interface allows a sender to do button management, providing a convenient means for a Sender alter parameters associated with the button. This is accomplished by installing a Button Management Agent 76, or a custom application program (a software agent) on the Sender's computing device 17. This agent contains a directory of the Sender's buttons and provides easy management menus for the Sender to update and modify state parameters for the buttons. It should be appreciated that all buttons need not have the same state, and there are many ways to devise convenient control and setting of the state parameters. It should also be noted that if the Sender's computing device 17 is a smart cell phone equipped with a GPS (Global Positioning System), then location information can be used to drive some of the options. For example, all calls could be blocked when the Sender is at home.

The button parameters may also vary by individual using the button to do the contact, or for other purposes. For example, the button may initiate one form of contact if the button user is a specific one or more people, and another form of contact for other users. The parameters may also change by time, so that at certain times of the day, an email is generated, and at other times of the day, a phone call is made. Combinations of these parameters are also contemplated.

In other embodiments, one of the sender specific parameters may be kept confidential and one or more may be sent to the user, based upon the identity of the user, or any of the other parameters. Also, certain users may be given an option to themselves select or assist in selecting the contact methodology. For example, user category A is given an option to activate the button, and the sender is emailed. User group B is given the phone number of the sender. User group C is given a choice to call or email the sender, at that user's option, but is not given the email address or the phone number of the sender. Users in group D may be given the phone number and email address of the sender, and told to contact the sender by whatever means they deem appropriate. User group E may be blocked from any contact whatsoever.

Although preferred embodiments of the invention have been disclosed for illustrative purposes, those skilled in the art will appreciate that many additions, modifications, and substitutions are possible without departing from the scope and spirit of the invention as defined by the accompanying claims.

What is claimed:

1. A method for establishing a communication connection between a calling computing device connected to a network and a second device, comprising the steps of:
   providing for the calling computing device a software button originating outside the calling computing device which is associated with the second device and is actuatable by a user of the calling computing device;
   upon actuation of the software button by the user, downloading an executable agent to the calling computing device, said agent containing control information for a communication to be established by the calling computing device to the second device, the control information including one of: (i) an address, not derived from or accessible to the user of the calling computing device, for contacting the second device; and (ii) information for controlling the type of connection to be established between the calling computing device and second device, based on information provided from the user of the second device; and
   the agent being constructed to effect establishment of communication between the calling computing device and second device based upon the control information, wherein
   the second device is one of a plurality of devices used by a called party which utilize different types of communication connections, the information provided from the user of the second device including instructions on which of the plurality of devices to use for communication in predefined operating states, the information for controlling the type of connection being determined by the instantaneous operating state, the executable agent being constructed to configure the calling computing device so as to utilize a communication interface type consistent with the instantaneous operating state, whereby communication is effected with the device selected by the called party for the instantaneous operating state.

2. The method of claim 1 wherein the operating states include one of: (i) the urgency of the call; (ii) the subject matter of the call; (iii) the time or day of the call; (iv) the location of the called party; and (v)the context of the call.

3. The method of claim 1 wherein the types of communication connections include at least two of: (i) telephone; (ii) SMS; and (iii) e-mail.

4. The method of claim 1 wherein the software button is sent to the calling computing device from a button database, the called party being provided access to input and modify information on the database related to defining operating states to be associated, respectively, with each of the plurality of devices.

5. A system for establishing a communication connection between a calling computing device connected to a network and a second device, comprising:
   a generator of an executable agent constructed to establish a communication connection between the calling computing device and the second device and containing control information including one of: (i) an address, not derived from or accessible to the user of the calling computing device, for contacting the second device; and (ii) information for controlling the type of connection to be established between the calling computing device and second device, based on information provided from the user of the second device; and
   a software button which is associated with the second device and is the calling computing device, the software button being available to the calling computing device, being actuatable by a user thereof, and being constructed so that causes an executable agent from the generator to be downloaded to the calling computing device, wherein the second device is one of a plurality of devices used by a called party which utilize different types of communication connections, the information provided from the user of the second device including instructions on which of the plurality of devices to use for communication in predefined operating states, the system further comprising means for determining the instantaneous operating state, the executable agent from the generator being constructed to configure the calling computing device so as to utilize a communication interface type consistent with the instantaneous operating state, whereby communication is effected with the device selected by the called party for the instantaneous operating state.

6. The system of claim 5 wherein the operating states include one of: (i) the urgency of the call; (ii) the subject matter of the call; (iii) the time or day of the call; (iv) the location of the called party; and (v) the context of the call.

7. The system of claim 5 wherein the types of communication connections include at east two of: (i) telephone; (ii) SMS; and (iii) e-mail.

8. The system of claim 5 further comprising a button database containing information provided to the generator, the called party being provided access to input and modify information on the button database related to defining operating states to be associated, respectively, with each of the plurality of devices.

* * * * *